United States Patent
Duan et al.

(10) Patent No.: US 12,056,374 B2
(45) Date of Patent: Aug. 6, 2024

(54) DYNAMIC MEMORY COHERENCY BIASING TECHNIQUES

(71) Applicant: Alibaba Group Holding Limited, Georgetown (KY)

(72) Inventors: Lide Duan, Sunnyvale, CA (US); Dimin Niu, Sunnyvale, CA (US); Hongzhong Zheng, Los Gatos, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 540 days.

(21) Appl. No.: 17/166,975

(22) Filed: Feb. 3, 2021

(65) Prior Publication Data

US 2022/0244870 A1  Aug. 4, 2022

(51) Int. Cl.
G06F 3/06 (2006.01)

(52) U.S. Cl.
CPC .......... *G06F 3/0632* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,171,585 B2 | 10/2015 | Rajan et al. | |
| 9,432,298 B1 | 8/2016 | Smith | |
| 2005/0030061 A1 | 2/2005 | Ingino et al. | |
| 2007/0165035 A1 | 7/2007 | Dulak, Jr. et al. | |
| 2013/0097607 A1 | 4/2013 | Lewis et al. | |
| 2014/0208041 A1 | 7/2014 | Hyde et al. | |
| 2017/0083434 A1 | 3/2017 | Potash | |
| 2017/0083449 A1 | 3/2017 | Potash | |
| 2018/0225232 A1 | 8/2018 | Filippo et al. | |
| 2018/0292988 A1* | 10/2018 | Wang | G06F 11/3037 |
| 2018/0293183 A1 | 10/2018 | Cooray et al. | |
| 2018/0293185 A1 | 10/2018 | Vembu et al. | |
| 2018/0293776 A1 | 10/2018 | Ray et al. | |
| 2018/0307429 A1 | 10/2018 | Fu et al. | |
| 2019/0018806 A1* | 1/2019 | Koufaty | G06F 12/0806 |
| 2019/0198999 A1 | 6/2019 | Ashrafi | |
| 2019/0370177 A1* | 12/2019 | Olderdissen | G06F 12/122 |
| 2020/0364088 A1 | 11/2020 | Ashwathnarayan et al. | |
| 2021/0011864 A1* | 1/2021 | Guim Bernat | G06F 13/4022 |
| 2021/0182390 A1 | 6/2021 | Winterrowd | |
| 2022/0066931 A1 | 3/2022 | Ray et al. | |
| 2022/0075726 A1* | 3/2022 | Magill | G06F 12/0811 |

OTHER PUBLICATIONS

Ruggles, Gary, Introduction to the Compute Express Link (CXL) device types, Tech Design Forum, Sep. 13, 2019, https://www.techdesignforums.com/practice/technique/compute-express-link-cxl-device-types/ (Year: 2019).*

* cited by examiner

*Primary Examiner* — Arpan P. Savla
*Assistant Examiner* — Edmund H Kwong

(57) ABSTRACT

A dynamic bias coherency configuration engine can include control logic, a host threshold register, and device threshold register and a plurality of memory region monitoring units. The memory region monitoring units can include a starting page number register, an ending page number register, a host access register and a device access register. The memory region monitoring units can be utilized by dynamic bias coherency configuration engine to configure corresponding portions of a memory space in a device bias mode or a host bias mode.

17 Claims, 7 Drawing Sheets

DYNAMIC MEMORY COHERENCY BIASING TECHNIQUES

BACKGROUND OF THE INVENTION

A common aspect of computing systems is the accessing and caching of data shared by a host and one or more devices. Referring to FIG. 1, a computing system in accordance with the conventional art is shown. The compute system 100 can include a host 105 and one or more devices 110 coupled by one or more communication links 115. In one example, the host 105 and one or more devices 110 can be communicatively coupled together according to a protocol standard such as the compute express link (CXL) protocol. The system 100 can further include a host memory 120 coupled to the host 105, and optionally device memory 125 coupled to the one or more devices 110.

The host 105 can include a plurality of cores 130, 135, coherence and cache logic 140, communication logic 145, one or more communication interfaces 150, one or more communication input/output devices 155, and the like. The one or more devices 110 can include device logic 160, coherence and cache logic 165, one or more communication interfaces 170, and the like. The core 130, 135 of the host 105 and the device logic 160 of the one or more devices can generate memory access requests for data that can be stored in the host memory 120, the device memory 125 and/or the cache. The memory access requests can include read and write requests. The communication interfaces 150, 165 of the host 105 and one or more devices 110 can provide for input/output discovery, input/output register access, input output configuration, input/output initialization, input/output interrupt handling, direct memory access (DMA) and address translation services (ATS). The communication interfaces 150, 165 of the host 105 and one or more devices 110 can also provide for cache coherency and cache-memory flow. The communication interfaces 150, 165 of the host 105 and one or more devices 110 can also provide for memory flow control.

Referring now to FIG. 2, an exemplary communication protocol for coupling one or more devices to a host in accordance with the conventional art is shown. As illustrated, the exemplary communication protocol can be the CXL protocol. The communication protocol can include a transaction layer, a link layer and a physical layer. The transaction layer can include, for example, a peripheral component interface express (PCIe) transaction layer 205, a CXL transaction layer 210, and a CXL cache/memory transaction layer 215. The link layer can include a PCIe link layer 220, a CXL link layer 225, and a CXL cache/memory layer 230. The PCIe link layer 220 can be coupled to the PCI transaction layer 205, the CXL link layer 225 can be coupled to the CXL transaction layer 210, and the cache/memory link layer 230 can be coupled to the cache/memory transaction layer 215. The physical layer can include a PCIe/CXL logical physical layer 235, a PCIe/CXL analog physical layer 240, a static multiplexor 245, and a CXL dynamic multiplexor 250. The CXL dynamic multiplexor 250 multiplexes the communications from the CXL link layer 225 and CXL cache/memory link layer 230 to the static multiplexor 245 and vice-versa. The static multiplexor 245 further multiplexes that communication form the PCI link layer 220 to the PCIe/CXL logical physical layer 235 and PCIe/CXL analog physical layer 240, and vice versa.

Referring now to FIGS. 3-5, different device types in accordance with the CXL protocol are shown. The CXL protocol can include type 1 devices that include caching devices, accelerators or the like, as illustrated in FIG. 3. The type 1 device can include a processor 310 and an accelerator network interface card (NIC) 320. The processor 310 can include processor attached memory 330, 340 and cache 350. The accelerator NIC 320 can include cache 360. The type 1 device can be utilized for partitioned global address space (PGAS) NIC, NIC atomics, or the like. The type 1 device utilizes CXL.io and CXL.cache protocols.

The CXL protocol can also include type 2 devices that include a processor 410 and accelerator 420. As illustrated in FIG. 4, the processor 410 can include processor attached memory 430, 440 and cache 450. The accelerator 420 can include accelerator attached high bandwidth memory (HBM) 460, 470 and cache 480. The type 2 device can be utilized for a graphics processing unit, dense computation or the like. The type 2 device can utilize CXL.io, CXL.cache and CXL.memory protocols.

The CXL protocol can also include type 3 devices that include a processor 510 and memory buffer 520, as illustrated in FIG. 5. The processor 510 can include processor attached memory 530, 540 and cache 550. The memory buffer 520 can also include memory buffer attached memory 560-590 and cache 595. The type 3 device can be utilized for memory bandwidth expansion, memory capacity expansion, storage class memory or the like. The type 3 device can utilize CXL.io and CXL.memory protocols.

SUMMARY OF THE INVENTION

The present technology may best be understood by referring to the following description and accompanying drawings that are used to illustrate embodiments of the present technology directed toward system and method for dynamic memory coherency biasing.

In one embodiment, a dynamic bias coherency configuration engine can include a plurality of memory region monitoring units and control logic. Each memory region monitoring unit can be configured to track a number of access by a host to a corresponding monitored memory region and a number of access by a device to the corresponding monitored memory region. The control logic can be configured to determine a current number of accesses from a host and a current number of access from a device to a given memory region from a given one of the plurality of memory region monitoring units corresponding to the given memory region. The control logic can configure the given memory region to have a device bias when the current number of accesses from the host is less than a host access threshold value and the current number of accesses from the device is greater than a device access threshold. The control logic can configure the given memory region to have a host bias when the current number of accesses from the host is greater than the host access threshold and the current number of access from the device is less than the device access threshold. The control logic can further configure the given memory region to have the host bias when the current number of access from the host is greater than the host access threshold and the current number of access from the device is greater than the device access threshold. The control logic can also reassign a given memory region monitoring unit when the current number of accesses from the host is less than the host access threshold and the current number of accesses from the device is less than the device access threshold.

The control logic can further be configured to receive a memory access and determine if an address of the received memory access corresponds to one of a plurality of monitored memory regions. The control logic can be configured to determine if the received memory access is from the host or the device when the address of the received memory access corresponds to a corresponding one of the plurality of monitored memory regions. A host access count for the corresponding memory region can be increment by the control logic when the received memory access is from the host. A device access count for the corresponding memory region can be incremented by the control logic when the received memory access is from the device.

In another embodiment, a method of dynamically configuring memory coherency bias can include determining a current number of accesses from a host and a current number of access from a device to a given memory region. The given memory region can be configured to have a device bias when the current number of accesses from the host is less than a host access threshold and the current number of accesses from the device is greater than a device access threshold. The given memory region can be configured to have a host bias when the current number of accesses from the host is greater than the host access threshold and the current number of access from the device is less than the device access threshold. The given memory region can also be configured to have the host bias when the current number of access from the host is greater than the host access threshold and the current number of access from the device is greater than the device access threshold.

The method of dynamically configuring memory coherency bias can also include receiving a memory access and determining if an address of the received memory access corresponds to one of a plurality of monitored memory regions. When the address of the received memory access corresponds to a corresponding one of the plurality of monitored memory regions, it can be determined if the received memory access is from the host or the device. When the received memory access is from the host, a count of the number of access from the host can be incremented for the corresponding one of the plurality of monitored memory regions. When the received memory access is from the device, a count of the number of access from the device can be incremented for the corresponding one of the plurality of monitored memory regions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
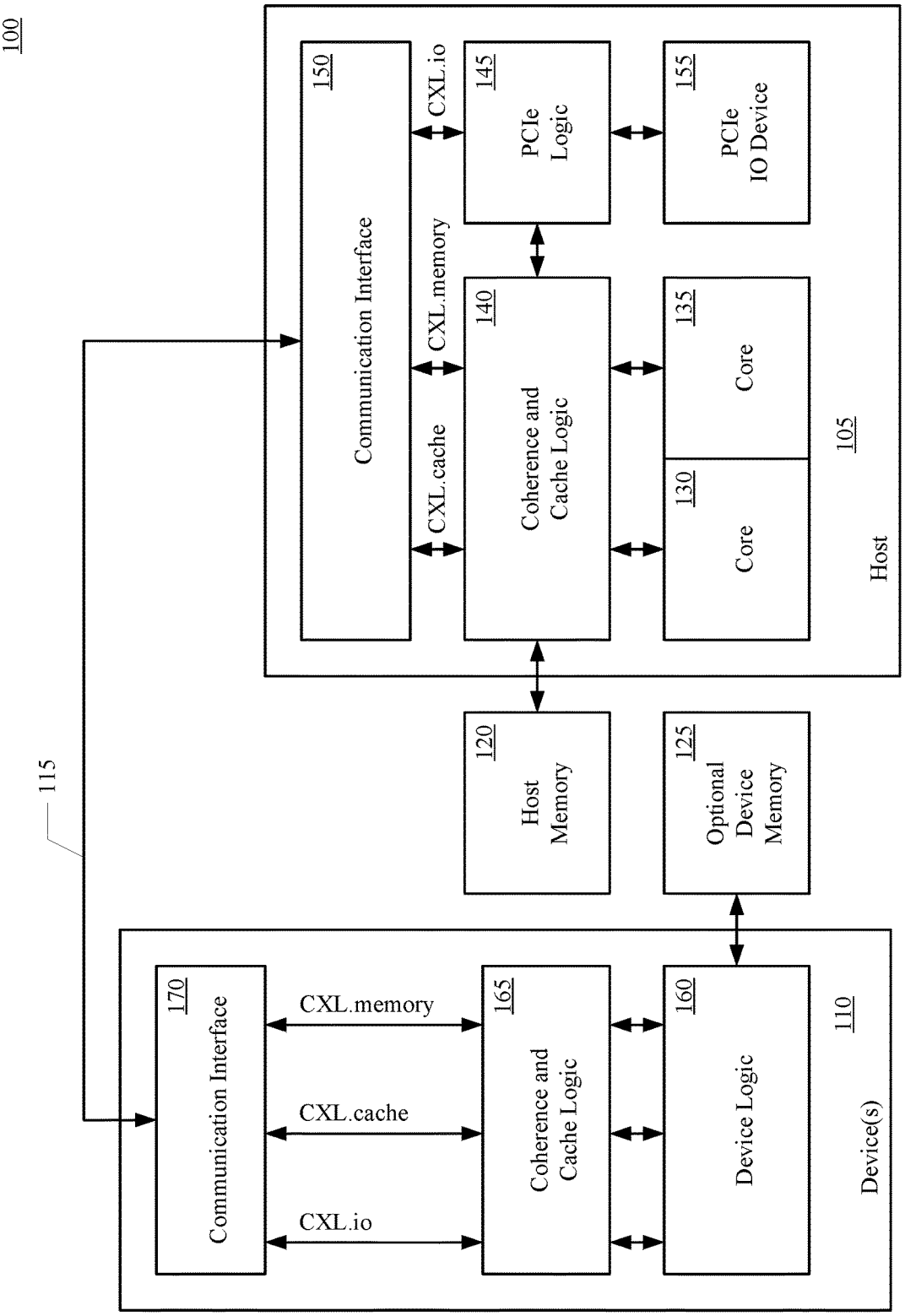
FIG. 1 shows a computing system in accordance with the conventional art.
Figure 2:
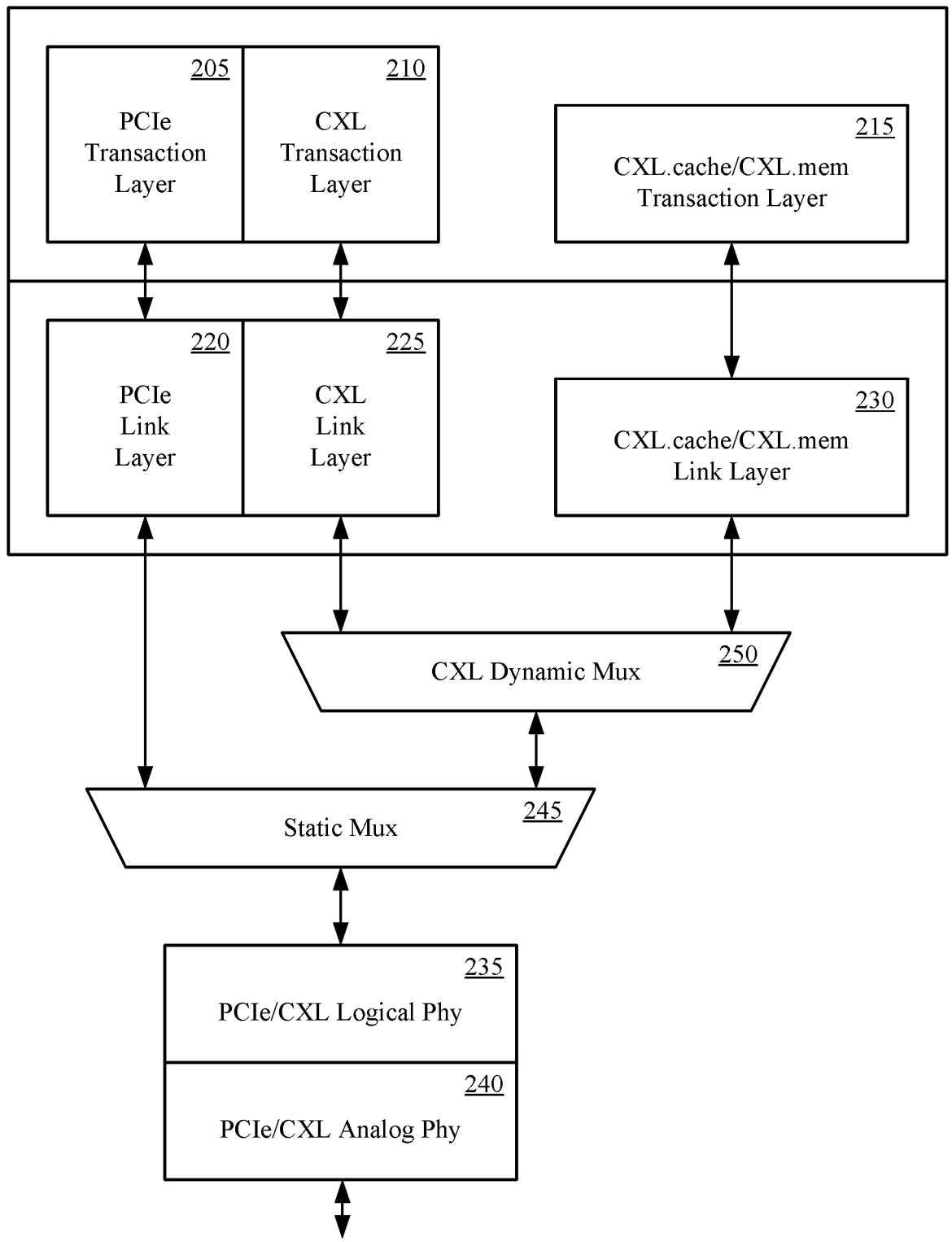
FIG. 2 shows an exemplary communication protocol for coupling one or more devices to a host in accordance with the conventional art.
Figures 3, 4, 5:
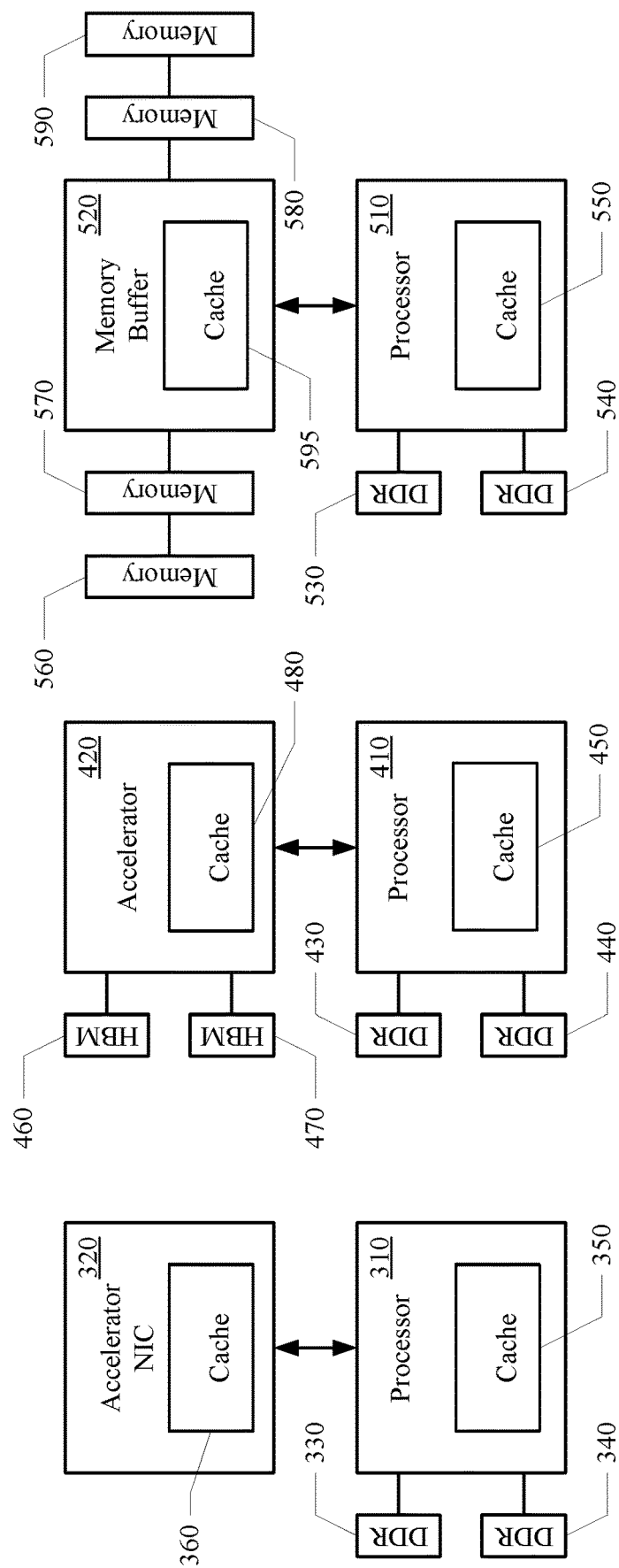
FIG. 3 shows a compute express link (CXL) type 1 device according to the conventional art.
FIG. 4 shows a CXL type 2 device according to the conventional art.
FIG. 5 shows a CXL type 3 device according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 6:
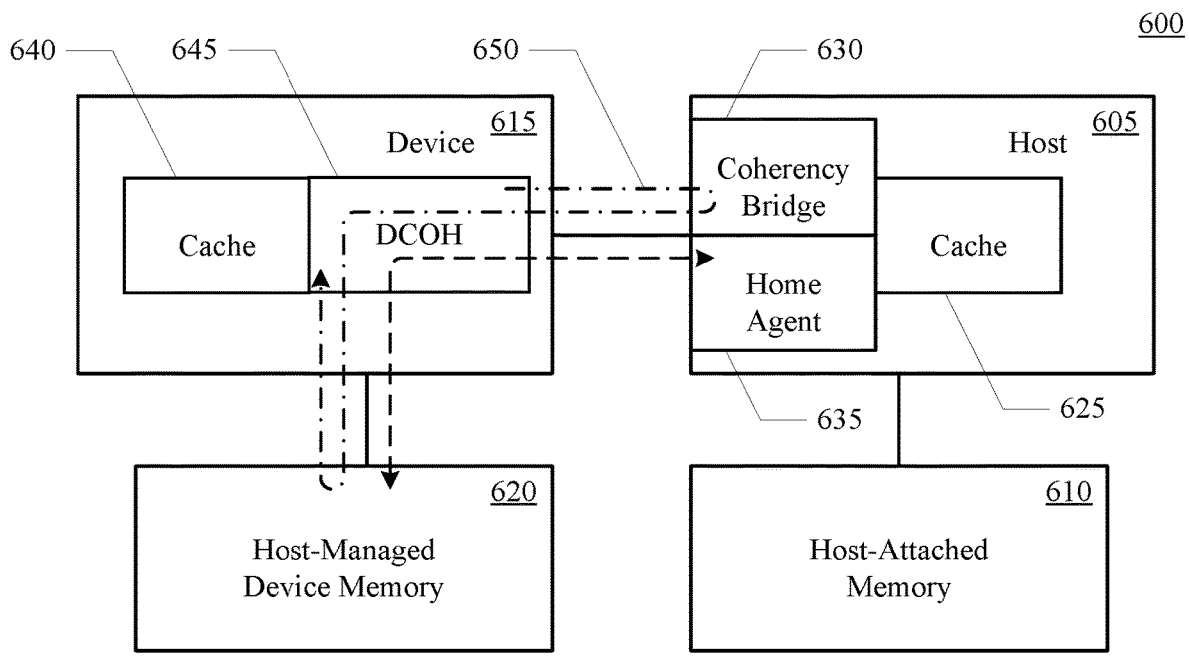
FIG. 6 shows a compute system, in accordance with aspects of the present technology.
Figure 7:
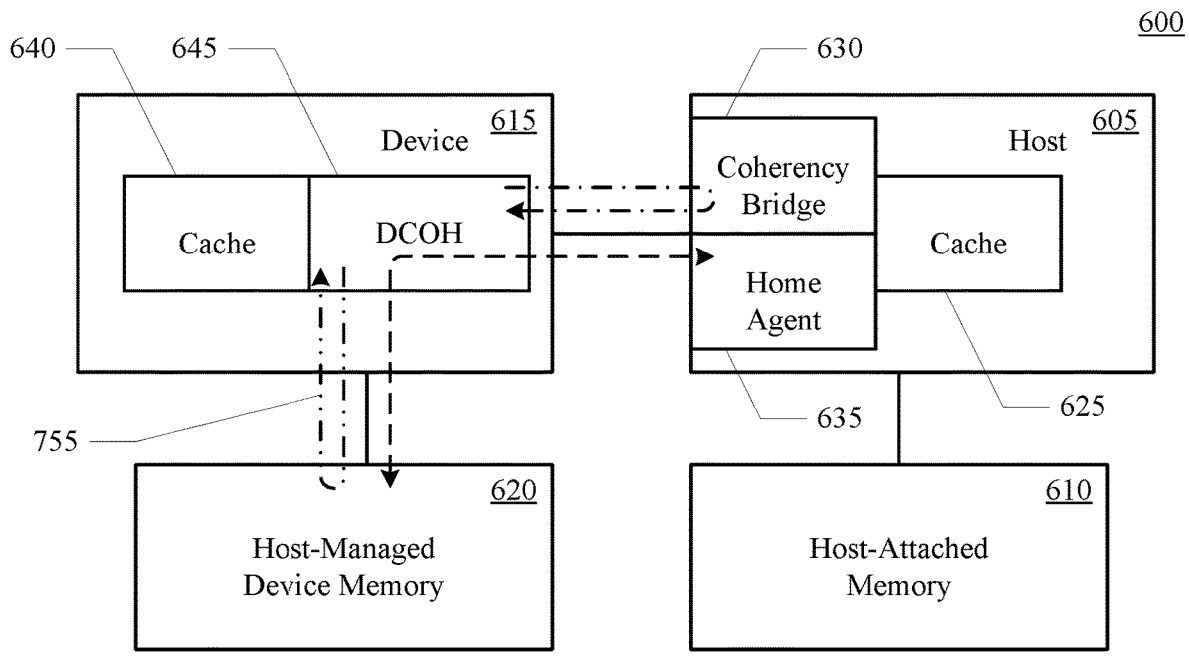
FIG. 7 shows a compute system, in accordance with aspects of the present technology.

Referring to FIGS. 6 and 7, a compute system, in accordance with aspects of the present technology, is shown. In one implementation, the compute system 600 can be a compute express link (CXL) type 2 device. Compute express link (CXL) is an open standard interconnect for high-speed processor-to-device, processor-to-memory and the like interconnects. The compute system 600 can include a host processor or device (hereinafter simply referred to as the host) 605, host-attached memory 610, a device 615 and host-managed device memory 620. The host-attached memory 610 can be communicatively coupled to the host 605. Likewise, the device 615 can be communicatively coupled to the host 605. The host-managed device memory 620 can be communicatively coupled to the host 605 through the device 615. The host 605 can include cache 625 and coherency and cache logic. In one implementation, the coherency and cache logic of the host 605 can include a coherency bridge 630 and a home agent 635. The device 615 can include cache 640 and coherency and cache logic. In one implementation the coherency and cache logic of the device 615 can include a device coherency (DCOH) engine 645.

FIG. 6 illustrates a host-bias based memory coherency configuration of the compute system 600. In the host-bias configuration, memory accesses are symmetric for both the host 605 and the device 615. The host 605 can cache data from both the host-attached memory 610 and the host-managed device memory 620. Similarly, the device 615 can cache data from both host-attached memory 610 and the host-managed device memory 620. When accessing the host-managed device memory 620, the device 615 sends a corresponding request 650 to the host 605 to resolve coherency. Upon resolution of coherency, the corresponding request 650 is sent from the host 605 back through the device 615 to the host-managed device memory 620 for servicing.

Referring now to FIG. 7, a device-bias based memory coherency configuration of the compute system, in accordance with aspects of the present technology, is illustrated. In the device-bias configuration, the host 605 does not cache data from the host-managed device memory 620. As a result, the device 615 can directly access data 755 in the host-managed device memory 620 without sending the access request to the host 605.

Figure 8:
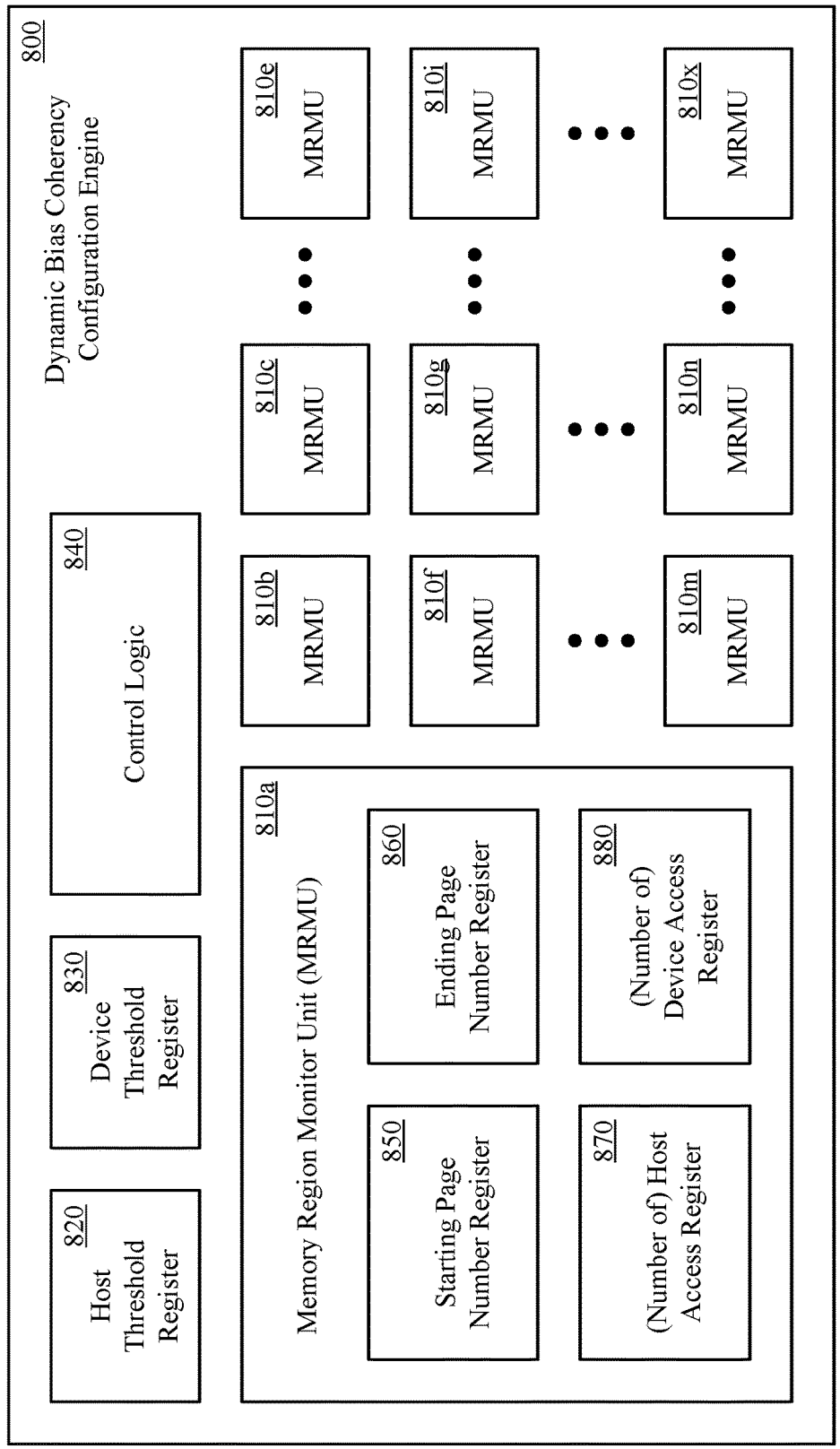
FIG. 8 shows a dynamic bias coherency configuration engine, in accordance with aspects of the present technology.

The coherency and cache logic of the host 605 and the device 615 can include a dynamic bias coherency configuration engine, as shown in FIG. 8. The dynamic bias coherency configuration engine 800, in accordance with aspects of the present technology, can include a plurality of memory region monitoring units (MRMU) 810a-810x, a host threshold register 820, a device threshold register 830 and control logic 840. The MRMUs can include a starting page number register 850, an ending page number register 860, a host access register 870 and a device access register 880. Each MRMU can be configured to monitor a number of accesses (ACC_h) from the host 605 and a number of accesses (ACC_d) from the device 615 to a given monitored memory region. The given monitored memory region can be identified by a starting page number and an ending page number stored in the respective starting page number register 850 and ending page number register 860. The host access register 870 can count the number of accesses by the host 605 to the given monitored memory region. Similarly, the device access register 880 can count the number of accesses by the device 615 to the given monitored memory region. The host access threshold register 820 can be configured for storing a host access threshold value, and the device access threshold register 830 can be configured for storing a device access threshold value. The host access threshold and device access threshold values can be specified by a user during an initialization phase. The host access threshold value and device access threshold value can optionally be changed during runtime operation.

Figure 9:
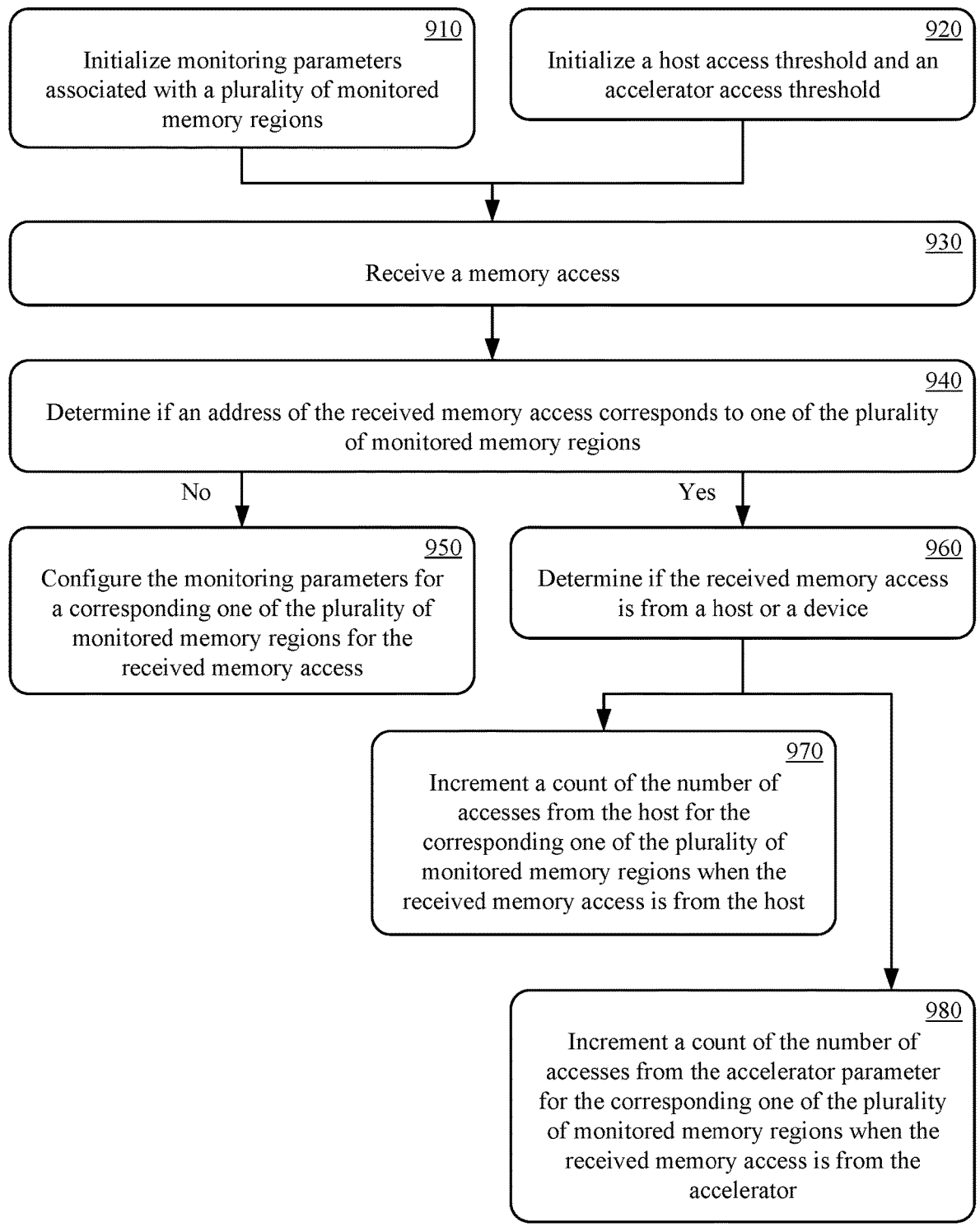
FIG. 9 shows a memory region monitoring method, in accordance with aspects of the present technology.

Operation of the compute system 600 will be further described with reference to FIG. 9 in combination with FIGS. 6-8. FIG. 9 shows a memory region monitoring method. The method can begin with initializing a plurality of monitored memory regions, at 910. In one implementation, a memory address space of the host-attached memory 610 and the host-managed device memory 620 can be divided by the number of memory region monitoring units 810a-810x of the dynamic bias coherency configuration engine 800 the coherency and cache logic of the host 605 and the device 615 respectively. The starting page number register 820 and ending page number register 830 of the respective memory region monitoring units 810a-810x can be set to respective portions of the memory address spaced based on the division of the memory address space by the number of memory region monitoring units. The memory region monitoring units 810a-810x can be further initialized by setting the host access register 840 to zero, and the device access register 850 to zero for each of the memory region monitoring units 810a-810x. At 920, a host access threshold and a device access threshold can be set to corresponding predetermined values. In one implementation, a user specified host access threshold value can be loaded into the host access threshold register 860 and a user specified device access threshold value can be loaded into the device register 870 of the dynamic bias coherency configuration engine 800.

The method can then further proceed with receiving memory accesses, at 930. In one implementation, the coherency and cache logic of the host 605 and the device 615 can receive memory access requests from the host 605 and the device 615 respectively. The memory access requests can include various read and write operations to and from the host-managed device memory 620 and the host-attached memory 610 by the host 605 and the device 615.

At 940, it can be determined if an address of the received memory access corresponds to one of a plurality of monitored memory regions. In one implementation, the dynamic bias coherency configuration engine 800 can determine if the memory address of the received memory access is within a range of a starting page number and ending page number stored in one of the plurality of memory region monitor units 810a-810x.

When the address of the received memory access does not correspond to one of the plurality of monitored memory regions 810a-810x, an available one of the plurality of monitored memory regions 810a-810x can be initialized to correspond to the memory address of the received memory access request, at 950. In one implementation, an available one of the plurality of memory region monitoring units (MRMU) 810a-810x can be initialized by loading a starting page number associated with the address of the received memory access into the starting page number register 820, and an ending page number associated with the address of the received memory access can be loaded into the ending page number register 830 of an available MRMU.

When the address of the received memory access corresponds to one of the plurality of monitored memory regions, it can be determined if the received memory access is from a host 605 or a device 615, at 960. In one implementation, the dynamic bias coherency configuration engine 800 can determine if the given memory access was received from the host 605 or from the device 615.

When the received memory access is from the host 605, a count of the number of accesses from the host for the corresponding one of the plurality of monitored memory regions can be incremented, at 970. In one implementation, the value in the host access register 840 can be incremented when the received memory access is from the host 605.

When the received memory access is from the device 630, a count of the number of accesses from the device for the corresponding one of the plurality of monitored memory regions can be incremented, at 980. In one implementation, the value in the device access register 840 can be incremented when the received memory access is from the device 615.

Figure 10:
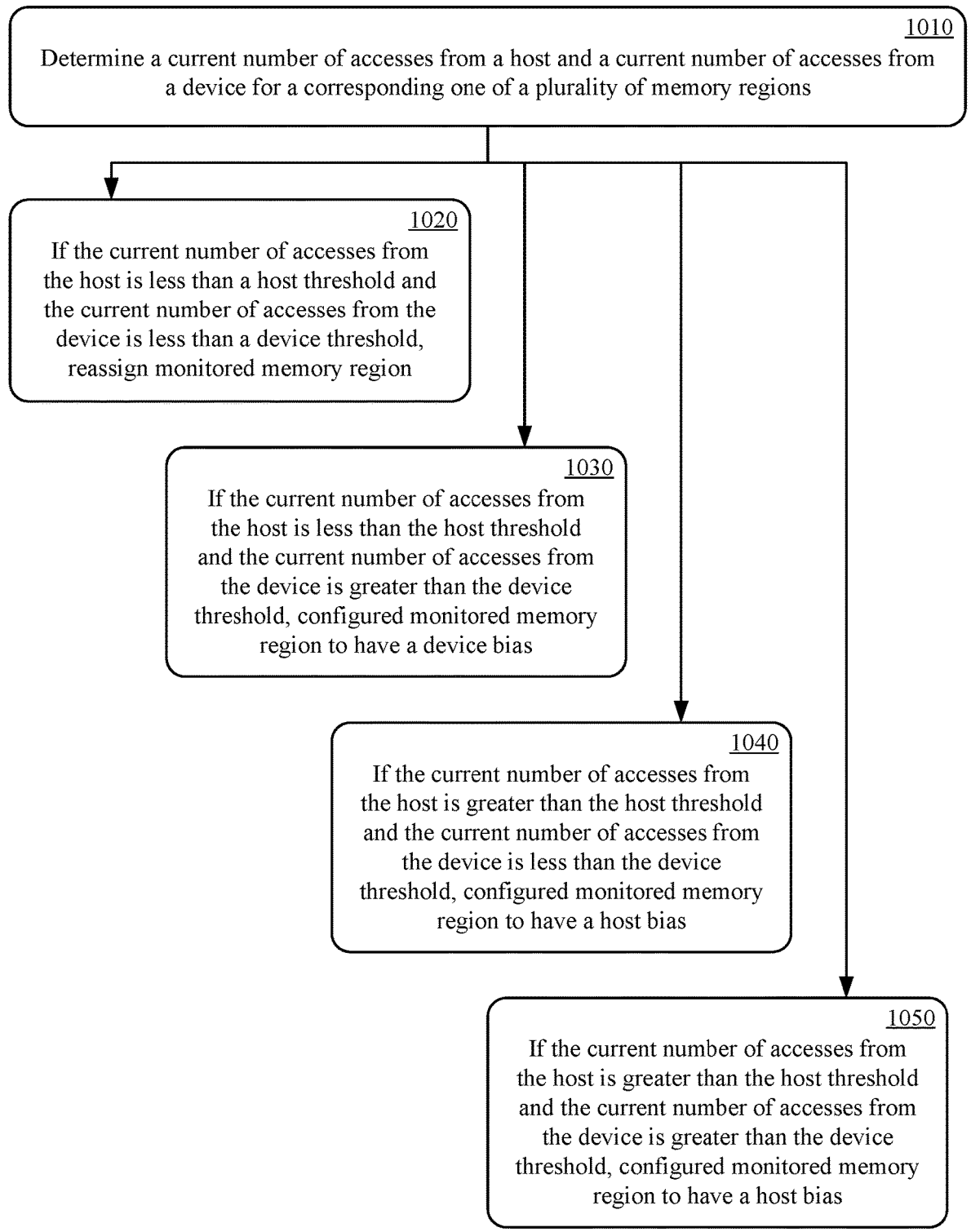
FIG. 10 shows a method of dynamically configuring memory coherency bias, in accordance with aspects of the present technology.

Operation of the compute system 600 will be further described with reference to FIG. 10 in combination with FIGS. 6-9. FIG. 10 shows a method of dynamically configuring biased based memory coherency in accordance with aspects of the present technology. The method can include determining a current number of accesses by the host 605 and a current number of accesses by the device 615, at 1010. In one implementation, the dynamic bias coherency configuration engine 800 can periodically retrieve the current value of the host access register 840 and the current value of the device access register 850 for each currently assigned monitored memory region unit 810a-810x.

If the current number of accesses by the host 605 is less than a host access threshold and current number of accesses by the device 615 is less than a device access threshold, parameters for monitoring a current memory region can be reassigned, 1020. In one implementation, the dynamic bias coherency configuration engine 800 can compare the current value in the host access register to the predetermined host access threshold, and the current value in the device access register to the predetermined device access threshold. When the current value in the host access register is less than the host access threshold and the current value in the device access register is less than a device access threshold, the dynamic bias coherency configuration engine 800 can reassign the corresponding monitored memory region unit.

If the current number of accesses by the host 605 is less than the host access threshold and the current number of accesses by device 615 is greater than the device access threshold, the corresponding monitored memory region can be configured to have a device bias, 1030. In one implementation, the dynamic bias coherency configuration engine 800 can compare the current value in the host access register to the predetermined host access threshold, and the current value in the device access register to the predetermined device access threshold. When the current value in the host access register is less than the host access threshold and the current value in the device access register is greater than a device access threshold, the dynamic bias coherency configuration engine 800 can configure the memory region for the corresponding monitored memory region unit to have a device bias configuration. The device bias configuration can advantageously increase performance when a corresponding memory region is accessed by the device more than the host. The device bias configuration enables the device 615 to access its local memory at a relatively high bandwidth without incurrent significant coherency overhead, such as snoops to the host cache. In the device-bias configuration, the host 605 does not cache data from the host-managed device memory 620. As a result, the device 615 can directly access data 755 in the host-managed device memory 620 without sending the access request to the host 605.

If the current number of accesses by the host 605 is greater than the host access threshold and current number of accesses by the device 615 is less than the device access threshold, the corresponding monitored memory region can be configured to have a host bias, 1040. In one implementation, the dynamic bias coherency configuration engine 800 can compare the current value in the host access register to the predetermined host access threshold, and the current value in the device access register to the predetermined device access threshold. When the current value in the host access register is greater than the host access threshold and the current value in the device access register is less than the device access threshold, the dynamic bias coherency configuration engine 800 can configure the memory region for the corresponding monitored memory region unit to have a host bias configuration. The host bias configuration can advantageously increase performance when a corresponding memory region is accessed by the host 605 more than the device 615. In the host-bias configuration, memory accesses are symmetric for both the host 605 and the device 615. The host 605 can cache data from both the host-attached memory 610 and the host-managed device memory 620. Similarly, the device 615 can cache data from both host-attached memory 610 and the host-managed device memory 620. When accessing the host-managed device memory 620, the device 615 sends a corresponding request 650 to the host 605 to resolve coherency. Upon resolution of coherency, the corresponding request 650 is sent from the host 605 back through the device 615 to the host-managed device memory 620 for servicing.

If the current number of accesses by the host is greater than the host access threshold and current number of accesses by the device is greater than the device access threshold, the corresponding monitored memory region can be configured to have a host bias, 1040. In one implementation, the dynamic bias coherency configuration engine 800 can compare the current value in the host access register to the predetermined host access threshold, and the current value in the device access register to the predetermined device access threshold. When the current value in the host access register is greater than the host access threshold and the current value in the device access register is greater than the device access threshold, the dynamic bias coherency configuration engine 800 can configure the memory region for the corresponding monitored memory region unit to have a host bias configuration. Again, the host bias configuration can advantageously increase performance with a corresponding memory region is accessed by the host 605 more than the device 615. In the host-bias configuration, memory accesses are symmetric for both the host 605 and the device 615. The host 605 can cache data from both the host-attached memory 610 and the host-managed device memory 620. Similarly, the device 615 can cache data from both host-attached memory 610 and the host-managed device memory 620. When accessing the host-managed device memory 620, the device 615 sends a corresponding request 650 to the host 605 to resolve coherency. Upon resolution of coherency, the corresponding request 650 is sent from the host 605 back through the device 615 to the host-managed device memory 620 for servicing.

The processes at 1010-1050 can be periodically repeated to adjust the memory coherency bias to adjust for changes in the memory space utilization by the host 610 and device 630. In addition, the monitored memory regions reassigned at 1020 can be utilized to monitor other regions of the memory space. For example, a memory region monitor unit initialized to monitor a given region of the memory space, can be reassigned by the dynamic bias coherency configuration engine 800 to monitor another region of the memory space when the initial given memory space is inactive. Similarly, the dynamic bias coherency configuration engine 800 can split an active monitored memory region and reassign a given memory region monitor unit (MRMU) to the split memory region to provide finer granularity of memory coherence bias configuration. Furthermore, the above described dynamic configuration of the memory coherency bias can be combined with any software-based bias coherency management scheme.

The dynamic host/device bias-based memory coherency techniques, in accordance with aspects of the present technology, advantageously maintain cache coherency for the device. Aspects of the present technology advantageously identifies the desired bias coherency mode for each memory region so that the system performance can be optimized. The host/device bias configuration can advantageously be dynamically configured by reassigning and/or resizing the monitored memory regions, and/or changing the host access threshold and/or device access threshold values.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A dynamic bias coherency configuration engine, comprising:
   a plurality of memory region monitoring units, wherein each memory region monitoring unit is configured to track a number of accesses by a host to a corresponding monitored memory region and a number of accesses by a device to the corresponding monitored memory region; and
   control logic configured to:
      determine a current number of accesses from the host and a current number of accesses from the device to a given memory region from a given one of the plurality of memory region monitoring units corresponding to the given memory region;
      reassign a given memory region monitoring unit when the current number of accesses from the host is less than a host access threshold and the current number of accesses from the device is less than a device access threshold;
      configure the given memory region to have a device bias to increase access performance of the device, when the current number of accesses from the host is less than the host access threshold and the current number of accesses from the device is greater than the device access threshold;
      configure the given memory region to have a host bias to increase the access performance of the device, when the current number of accesses from the host is greater than the host access threshold and the current number of accesses from the device is less than the device access threshold; and
      configure the given memory region to have the host bias to increase the access performance of the device, when the current number of accesses from the host is greater than the host access threshold and the current number of accesses from the device is greater than the device access threshold.

2. The dynamic bias coherency configuration engine of claim 1, wherein:
   the plurality of memory region monitoring units include:
      a starting page number register for storing a starting page number of the corresponding monitored memory region and an ending page number register for storing an ending page number of the corresponding monitored memory region; and
   the control logic is further configured to:
      compare an address of the given memory region of a memory access request to the starting page number stored in the starting page number register and the ending page number stored in the ending page number register of one or more of the plurality of memory region monitoring units to determine the given one of the plurality of memory region monitoring units corresponding to the given memory region.

3. The dynamic bias coherency configuration engine of claim 2, further comprising:
   a host threshold register for storing the host access threshold; and
   a device threshold register for storing the device access threshold, and
   wherein the plurality of memory region monitoring units include:
      a host access register for storing the current number of accesses from the host to the corresponding monitored memory regions and a device access register for storing the current number of accesses from the device to the corresponding monitored memory regions, and wherein the control logic is further configured to:
compare the current number of accesses from the host in the host access register to the host access threshold stored in the host threshold register; and
compare the current number of accesses from the device in the device access register to the device access threshold stored in the device threshold register.

4. The dynamic bias coherency configuration engine of claim 3, wherein the control logic is further configured to:
receive a memory access;
determine if an address of the received memory access corresponds to one of a plurality of monitored memory regions;
determine if the received memory access is from the host or the device when the address of the received memory access corresponds to a corresponding one of the plurality of monitored memory regions;
increment the current number of accesses from the host in the host access register of the corresponding memory region monitor unit when the received memory access is from the host; and
increment the current number of accesses from the device in the device access register of the corresponding memory region monitoring unit when the received memory access is from the device.

5. The dynamic bias coherency configuration engine of claim 4, wherein the control logic is further configured to:
configure monitoring parameters for the corresponding one of the plurality of monitored memory regions for the received memory access when the address of the received memory access does not correspond to a corresponding one of the plurality of monitored memory regions.

6. The dynamic bias coherency configuration engine of claim 5, wherein the control logic is further configured to:
initialize the monitoring parameters associated with the plurality of monitored memory regions prior to receiving the memory access.

7. The dynamic bias coherency configuration engine of claim 5, wherein the control logic is further configured to:
initialize the host access threshold and an accelerator access threshold prior to receiving the memory access.

8. A method of dynamically configuring memory coherency bias, comprising:
determining a current number of accesses from a host and a current number of accesses from a device to a given memory region,
reassigning monitoring of the given memory region when the current number of accesses from the host is less than a host access threshold and the current number of accesses from the device is less than a device access threshold;
configuring the given memory region to have a device bias to increase access performance of the device, when the current number of accesses from the host is less than the host access threshold and the current number of accesses from the device is greater than the device access threshold;
configuring the given memory region to have a host bias to increase the access performance of the device, when the current number of accesses from the host is greater than the host access threshold and the current number of accesses from the device is less than the device access threshold; and
configuring the given memory region to have the host bias to increase the access performance of the device, when the current number of accesses from the host is greater than the host access threshold and the current number of accesses front the device is greater than the device access threshold.

9. The method of dynamically configuring memory coherency bias according to claim 8, further comprising:
receiving a memory access;
determining if an address of the received memory access corresponds to one of a plurality of monitored memory regions;
determining if the received memory access is from the host or the device when the address of the received memory access corresponds to a corresponding one of the plurality of monitored memory regions;
incrementing a count of the number of accesses from the host for the corresponding one of the plurality of monitored memory regions when the received memory access is from the host; and
incrementing a count of the number of accesses from the device for the corresponding one of the plurality of monitored memory regions when the received memory access is from the device.

10. The method of dynamically configuring memory coherency bias according to claim 9, further comprising:
configuring monitoring parameters for the corresponding one of the plurality of monitored memory regions for the received memory access when the address of the received memory access does not correspond to a corresponding one of the plurality of monitored memory regions.

11. The method of dynamically configuring memory coherency bias according to claim 10, further comprising:
initializing the monitoring parameters associated with the plurality of monitored memory regions prior to receiving the memory access.

12. The method of dynamically configuring memory coherency bias according to claim 10, further comprising:
initializing the host access threshold and an accelerator access threshold prior to receiving the memory access.

13. The method of dynamically configuring memory coherency bias according to claim 9, wherein the device checks cache coherency with the host before accessing the given memory region when the given memory region is host biased.

14. The method of dynamically configuring memory coherency bias according to claim 9, wherein the device accesses the given memory region directly when the given memory region is device biased.

15. One or more non-transitory computing device readable media having instructions stored thereon that when executed by one or more processing units to perform a dynamic memory coherency bias configuration method comprising:
reassigning monitoring of a given memory region when a current number of accesses from a host is less than a host access threshold and a current number of accesses from a device is less than a device access threshold;
configuring the given memory region to have a device bias to increase access performance of the device, when the current number of accesses from the host is less than the host access threshold and the current number of accesses from the device is greater than the device access threshold;
configuring the given memory region to have a host bias to increase the access performance of the device, when the current number of accesses from the host is greater than the host access threshold and the current number of accesses from the device is less than the device access threshold; and configuring the given memory region to have the host bias to increase the access performance of the device, when the current number of accesses from the host is greater than the host access threshold and the current number of accesses from the device is greater than the device access threshold.

16. The one or more non-transitory computing device readable media having instructions stored thereon that when executed by the one or more processing units to perform the dynamic memory coherency bias configuration method of claim 15, further comprising:

receiving a memory access;

determining if an address of the received memory access corresponds to one of a plurality of monitored memory regions;

determining if the received memory access is from the host or the device when the address of the received memory access corresponds to a corresponding one of the plurality of monitored memory regions;

incrementing a count of the number of accesses from the host for the corresponding one of the plurality of monitored memory regions when the received memory access is from the host; and incrementing a count of the number of accesses from the device for the corresponding one of the plurality of monitored memory regions when the received memory access is from the device.

17. The one or more non-transitory computing device readable media having instructions stored thereon that when executed by the one or more processing units to perform the dynamic memory coherency bias configuration method of claim 16, further comprising:

configuring monitoring parameters for the corresponding one of the plurality of monitored memory regions for the received memory access when the address of the received memory access does not correspond to a corresponding one of the plurality of monitored memory regions.

* * * * *